United States Patent [19]

Miller

[11] Patent Number: 4,811,494

[45] Date of Patent: Mar. 14, 1989

[54] REMOVAL OF WATER FROM CARBONACEOUS SOLIDS BY USE OF METHYL FORMATE

[76] Inventor: Frank Miller, 925 Robin Rd., Somerville, N.J. 08876

[21] Appl. No.: 1,255

[22] Filed: Jan. 7, 1987
(Under 37 CFR 1.47)

[51] Int. Cl.[4] .............................................. F26B 3/00
[52] U.S. Cl. ............................................................ 34/9
[58] Field of Search ............................... 34/9; 60/39.02

[56] References Cited

U.S. PATENT DOCUMENTS

| | | | |
|---|---|---|---|
| 3,327,402 | 6/1967 | Lamb et al. | 34/9 |
| 4,014,104 | 3/1977 | Murphy | 34/9 |
| 4,286,390 | 9/1981 | Convers et al. | 34/9 |
| 4,339,882 | 7/1982 | Dickey et al. | 34/9 |
| 4,397,100 | 8/1983 | Dickey et al. | 34/9 |
| 4,422,246 | 12/1983 | Hardesty et al. | 34/9 X |
| 4,498,246 | 2/1985 | Cantu et al. | 34/9 |
| 4,524,581 | 6/1985 | Cascone et al. | 60/39.02 |

*Primary Examiner*—Steven E. Warner
*Attorney, Agent, or Firm*—Michael F. Esposito; David T. Untener; Larry W. Evans

[57] ABSTRACT

A solvent extraction process for the removal of water from carbonaceous solids utilizing methyl formate.

10 Claims, No Drawings

REMOVAL OF WATER FROM CARBONACEOUS SOLIDS BY USE OF METHYL FORMATE

BACKGROUND OF THE INVENTION

This invention relates to a method for dewatering or drying organic solid substitutes which contain large amounts of water and more particularly for removing water from carbonaceous solids, such as fossilized biomass materials including peat and coal.

Peat and certain other organic solid substrates contain substantial amounts of water. It is known that peat can contain up to 90 percent or more water, by weight, and this has been a major deterrent to its wider use as a fuel source.

It remains desirable to use peat and other biomass substrates as fuel sources by direct combustion or by high temperature conversion to a more convenient fuel, such as a fuel gas. In order to do so, however, as much of the water as possible must be removed from these materials prior to conversion since much of their potential heating value would otherwise by consumed in the evaporation of the water contained therein. For example, when peat is burned directly, much of the heat generated is used to evaporate the water originally present in the peat. As a result, the temperature produced by combustion is low and the efficiency of combustion heat transfer is greatly reduced. At a 90% water level, for example, there is essentially no available heat from peat. Available heat is the amount of heat from combustion minus the heat of vaporization of the associated water. At the 90% level, the heat required to vaporize the water is equal to or greater than the heat produced by burning the combustibles in the peat. At 80% and 70% moisture levels, only about 1000 and 1900 BTU's respectively, are produced per pound of peat. The available heat, however, increases sharply on dewatering.

In the past, water removal from carbonaceous materials, such as peat, included drying in the sun which is a slow and erratic process dependent upon variable weather conditions. Other processes, such as solvent extraction, have also been employed. For example, U.S. Pat. No. 4,339,883 discloses a process for removing water from peat or coal wherein a primary solvent is used to extract the water from the peat and a secondary solvent is used to separate the primary solvent from the water. Suitable primary solvent include alcohols, ketones, aldehydes, ethers, carboxylic acids and esters thereof, amines and amides. The patentee indicates that suitable carboxylic acids include $C_1$ to $C_7$ acids. The carboxylic acid esters, include ethylglycinate, tetrahydrofurfuryl acetic acid ester and carbitol acetate.

Similarly, U.S. Pat. No. 4,397,100 discloses a process for removing water from peat employing a primary solvent, preferably alcohols and a secondary solvent to remove the primary solvent from the water. Carboxylic acid esters, such as ethyl glycinate, tetrahydrofurfuryl acetic acid ester and carbitol acetate are also disclosed to be useful as primary solvents.

U.S. Pat. No. 4,014,104 discloses a process for drying particulate carbonaceous material such as coal, lignite and the like by treatment with methanol or other low heat of vaporization solvent. Similarly, U.S. Pat. No. 3,327,402 discloses a process for drying coal fines by contact with specific organic solvents, such as alkanols like methanol, ketones and similar esters.

U.S. Pat. No. 4,422,246 discloses drying fine coals by feeding the material to a pressurized zone and slurrying with a liquid water-miscible volatile organic solvent containing 1 to 4 carbon atoms. Acetone is indicated as preferred.

Notwithstanding prior art efforts, dewatering processes which are quick, reliable, energy inefficient and economical are still highly desired.

SUMMARY OF THE INVENTION

Accordingly, it is one object of the present invention to provide a method for the removal of water from carbonaceous solids.

Another object of this invention is to provide a solvent process for the removal of water from carbonaceous solids.

Still another object of the present invention is to provide a solvent process for dewatering carbonaceous solids which does not utilize expensive equipment and which is energy efficient.

These and other objects are accomplished herein by a process which comprises:

(a) contacting a carbonaceous solid containing water with methyl formate;

(b) removing the methyl formate-water mixture resulting from step (a); and (c) recovering the dewatered carbonaceous solid.

DETAILED DESCRIPTION OF THE INVENTION

In accordance with the present invention, it has been found that methyl formate is an excellent agent for the displacement and/or extraction of water from carbonaceous materials, such as lower rank coals, like peat and lignite. The methyl formate is very volatile and can be readily removed from the filter cake solids if desired, with very low expenditure of energy. Moreover, dry methyl formate, which can be recycled for use in the process, is easily recovered since the displaced and/or extracted water is soluble in the methyl formate to only a limited degree. Thus, the two phases, aqueous and methyl formate which result from the water removal process herein, are easily separated.

The process of the present invention is carried out by contacting and admixing a water containing carbonaceous solid with methyl formate. For purposes of this invention, the amount of methyl formate utilized is that amount sufficient to remove a substantial portion of the water from the carbonaceous solids. In particular, methyl formate from about 1 part, by weight, to about 10 parts by weight, per part by weight carbonaceous solids is contemplated herein. Preferably, from about 2 to 1 to 5 to 1 parts by weight (methyl formate to carbonaceous solids) is preferred. The contacting and admixture of the water containing carbonaceous solids with the methyl formate is carried out for a sufficient period of time to obtain the desired results. Generally a period of from about 5 minutes to about 1 hour, at a temperature within the range of from about 20° C. to about 30° C., is preferred.

In furtherance of the present process, the methyl formate solvent and aqueous phase are then filtered off from the solids. Typically, filtering may be accomplished by any conventional means, such as by vacuum filtration. For optimum results, extraction of the water from the solids with the methyl formate solvent is generally carried out two, three or more times depending upon the water content of the solids. The final remaining filter cake of carbonaceous solids contain only a small percentage of the original water and is suitable as such for use of a combustible fuel or in a chemical process as a feedstock.

The water displaced from the carbonaceous solids by the methyl formate treatment is easily removed from the methyl formate because the water is soluble in the methyl formate only to a limited degree and two phases which are easily separable are present, namely an aqueous phase and a wet methyl formate phase.

Any carbonaceous solids, such as coals, which contain water or moisture, are suitable for water removal by the present process. Such coals include, for example, lower rank coals like peat, lignite, Brown coal and the like and higher rank water containing coals. Micronized coal (i.e. particle sizes below about 15 microns), containing moisture or water, is particularly well treated by the present process.

Thus, it is readily apparent that the present solvent extraction process is quick, reliable and economical. It is carried out at ambient temperatures and solvent recoveries are readily achieved. No expensive equipment, such as high pressure apparatus, is required.

In order that those skilled in the art may better understand how the present invention may be practiced, the following examples are given by way of illustration and not by way of limitation.

EXAMPLE 1

5.0 grams of raw peat (reed and sedge, hemic type) is placed in a 50 ml Erlenmeyer flask with 25.0 ml methyl formate. A small magnetic stirrer bar is added. The flask is put in a water bath containing water at about 20° C. The water bath containing the flask is put on a magnetic stirrer. The stirrer is allowed to spin the bar from about 10–30 minutes. The resultant mixture is then filtered using a Buchner funnel and filter paper. The extraction and filtering process are repeated 3 more times.

The press-cake after the fourth extraction contains about 12 weight percent water (calculated ignoring the small amount of methyl formate). The water is easily removed form the methyl formate since it forms a separate lower phase which may be separated using a separatory funnel. The methyl formate layer, which contains some water, can be recycled and used as such.

Obviously other modifications and variations of the present invention are possible in the light of the above teachings. It is, therefore, to be understood that changes may be made in the particular embodiments of this invention which are neither the full intended scope of the invention or defined by the appended claims.

I claim:

1. A process for the removal of water from carbonaceous solids, said process comprising the steps of:
   (a) contacting a carbonaceous solid containing water with methyl formate;
   (b) removing the resultant methyl formate-aqueous mixture from the carbonaceous solids; and
   (c) recovering the dewatered carbonaceous solid.

2. The process of claim 1 wherein the amount of methyl formate used is in the range of from about 1 part by weight to about 10 parts by weight per part by weight carbonaceous solids.

3. The process of claim 1 wherein the aqueous phase resulting from step (b) is removed from the methyl formate.

4. The process of claim 1 wherein the carbonaceous solid is contacted with the methyl formate at a temperature in the range of about 20° to about 30° C.

5. The process of claim 1 wherein said carbonaceous solid containing water is micronized coal.

6. The process of claim 1 wherein steps (a) and (b) are repeated at least two times prior to step (c).

7. The process of claim 1 wherein steps (a) and (b) are repeated at least three times prior to step (c).

8. The dewatered carbonaceous solid resulting from the process of claim 1.

9. The process of claim 1 wherein said carbonaceous solids containing water is a lower rank coal.

10. The process of claim 9 wherein said lower rank coal is peat.

* * * * *

UNITED STATES PATENT AND TRADEMARK OFFICE
CERTIFICATE OF CORRECTION

PATENT NO. : 4,811,494

DATED : March 14, 1989

INVENTOR(S) : Miller

It is certified that error appears in the above-identified patent and that said Letters Patent is hereby corrected as shown below:

Column 1, line 45, "U.S. Patent No. 4,339,883" should be --U.S. Patent No. 4,339,882--; and, Column 2, line 7, "inefficient" should be --efficient--.

Signed and Sealed this

Seventeenth Day of October, 1989

Attest:

DONALD J. QUIGG

Attesting Officer

Commissioner of Patents and Trademarks